United States Patent
Seki et al.

(10) Patent No.: US 7,062,149 B2
(45) Date of Patent: Jun. 13, 2006

(54) APPARATUS AND METHOD FOR DECOMPRESSING COMPRESSED DATA

(75) Inventors: Hiroyuki Seki, Sendai (JP); Akihiko Yamazaki, Sendai (JP); Keiichi Miyazaki, Yokohama (JP); Tsutomu Hashimoto, Suita (JP); Ken Monda, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1145 days.

(21) Appl. No.: 09/819,955

(22) Filed: Mar. 28, 2001

(65) Prior Publication Data

US 2002/0041758 A1 Apr. 11, 2002

(30) Foreign Application Priority Data

Mar. 31, 2000 (JP) .............................. 2000-098631

(51) Int. Cl.
*H04N 5/91* (2006.01)
(52) U.S. Cl. ........................................ 386/68; 386/111
(58) Field of Classification Search ................. 386/46, 386/68, 111, 125
See application file for complete search history.

(56) References Cited

U.S. PATENT DOCUMENTS 5,974,224 A * 10/1999 Nagata ..................... 386/109
6,058,241 A * 5/2000 Kawamura et al. ............ 386/68
6,473,558 B1 * 10/2002 Wu et al. ..................... 386/68

* cited by examiner

Primary Examiner—Huy T. Nguyen
(74) Attorney, Agent, or Firm—Pearne & Gordon LLP

(57) ABSTRACT

Herein disclosed is an apparatus for decompressing compressed data which can decompress compressed data at a high speed as compared with the prior art decompressing apparatus. The apparatus comprises recording means, reading means, decompressing means, at least one frame memory, picture designating means, and control means. The recording means is designed to record the compressed data to be decompressed by the decompressing means. The recording means includes at least one random access memory for recording the compressed data in order to enable the random access to read each GOP in any order. The reading means is adapted to read the compressed data to be decompressed by the decompressing means from the recording means. The decompressing means is operated to decompress the compressed data read from the recording means by the reading means. At least one frame memory is operated to store the decompressed data produced by the decompressing means. The picture designating means is designed to designate a targeted compressed picture to be decompressed by the decompressing means. The data of the targeted picture designated by the designating means is transmitted to the control means as a designated picture. Based on the designated picture, the control means is operated to control the reading means by specifying the compressed GOP including the designated picture and also to control the decompressing means by transmitting the data relating to the designated picture.

6 Claims, 18 Drawing Sheets

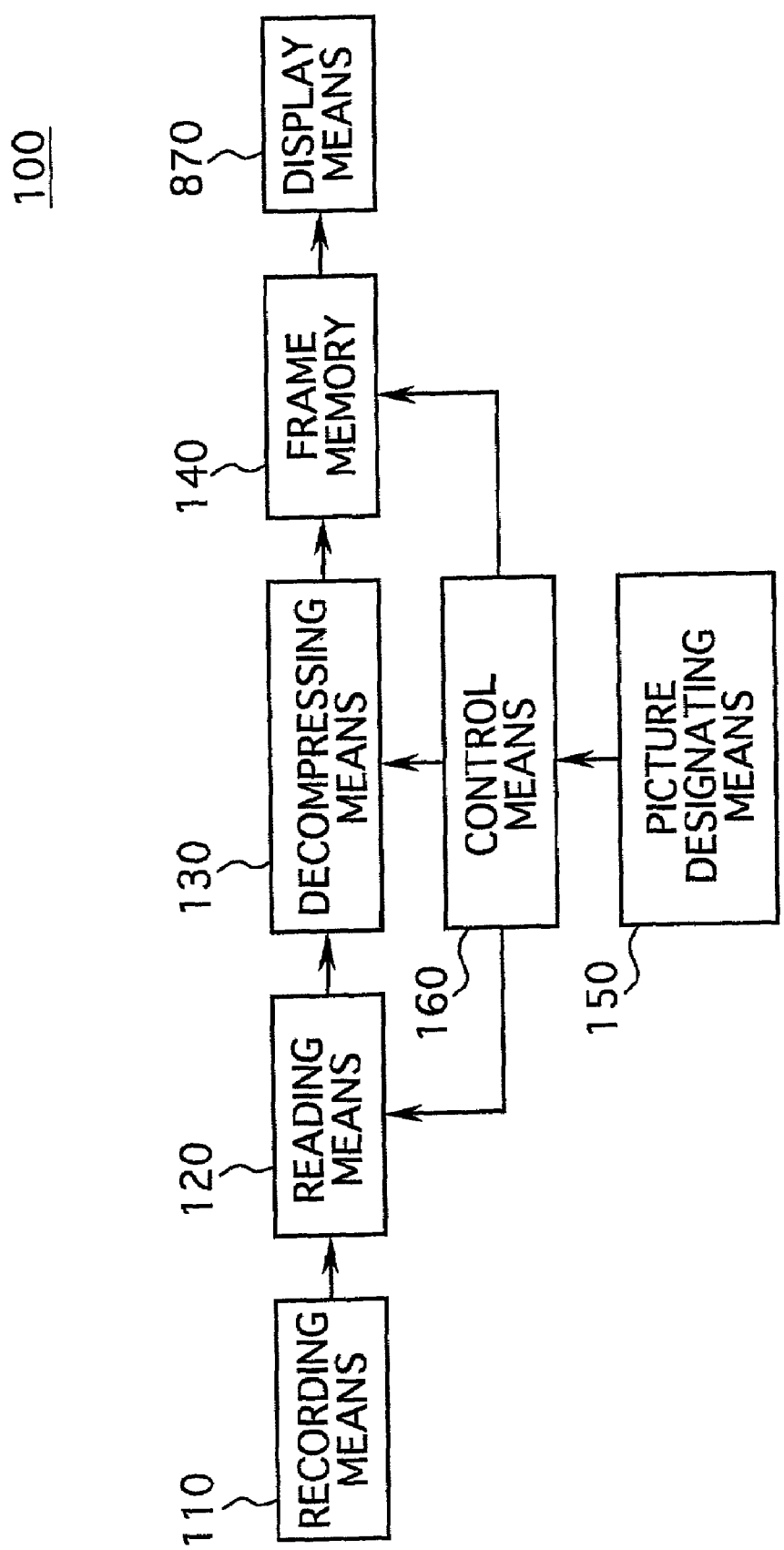
F I G. 8

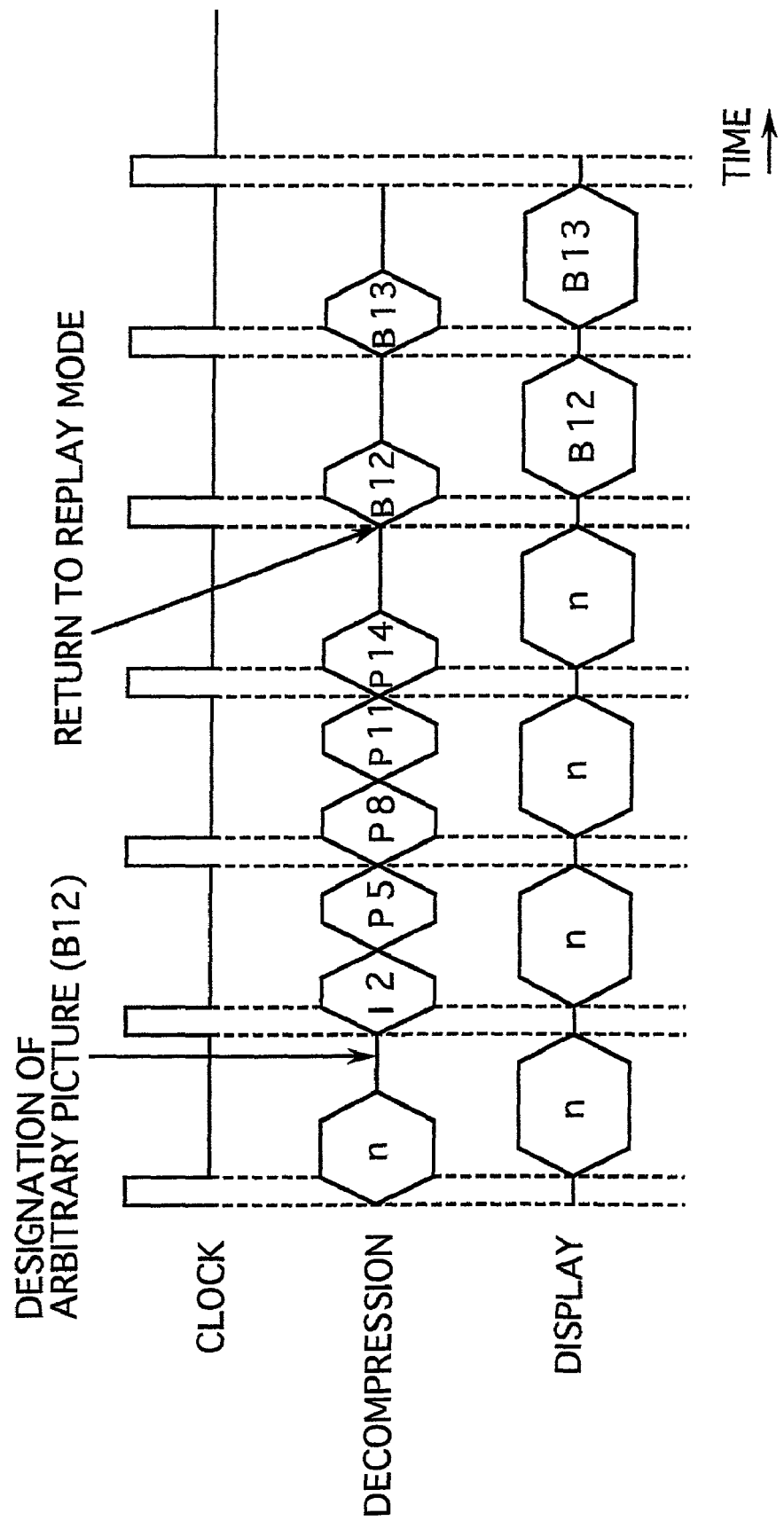
F I G. 16

APPARATUS AND METHOD FOR DECOMPRESSING COMPRESSED DATA

FIELD OF THE INVENTION

The present invention relates to an apparatus and a method for decompressing compressed data of moving pictures, and more particularly to an apparatus and a method for decompressing inter-frame compressed data of moving pictures to replay an arbitrary picture designated by a user at a high speed with less frame memories.

BACKGROUND OF THE INVENTION

There have so far been proposed a wide variety of video apparatus for replaying moving picture by using compressed data.

According to the recommendation by Moving Picture Expert Group, hereinafter simply referred to as "MPEG", of International Organization for Standard/International Electro-technical Commission Joint Technical Committee 1 Sub Committee 29, hereinafter simply referred to as "ISO/IEC JTC1 SC29", three types of compressed data are defined for moving pictures, that is, Intra-coded pictures, Predictive-coded pictures, and Bidirectionally-coded pictures, hereinafter simply referred to as "I-pictures", "P-pictures", and "B-pictures", respectively.

I-pictures are MPEG pictures that are intra-coded, that is, not coded differentially with respect to other pictures, such as P-pictures and B-pictures, and are obtained by compressing one frame data using spatial compression technique such as Discrete Cosine Transformation, hereinafter simply referred to as "DCT". P-pictures are MPEG pictures that are forward predicted from previous I-pictures or P-pictures using the inter-frame prediction coding technique. B-pictures are MPEG pictures that are Bidirectionally predicted from a combination of a preceding reference frame pictures or field pictures and a following reference frame pictures or field pictures (each reference is either an I-picture or a P-picture), using the inter-frame prediction coding technique. Since B-pictures are predicted as mentioned above, a B-picture is decompressed after decompressing the preceding I-picture or the preceding P-picture, and the B-picture is stored after storing the preceding I-picture or the preceding P-picture which is used to decompress the current picture in the frame memory as shown in FIG. 20. Therefore, the order of storing the B-picture shifts backward as compared with that of the original picture.

Generally, the compressed data are divided into a plurality of groups of pictures, hereinafter simply referred to as "GOP", in order to enable the random-access which can read each GOP in any order. Each GOP includes at least one I-picture and this I-picture may be inserted between the pictures of the other type at a regular interval.

The decompression process is performed in sequence by the stored data as shown in FIG. 17. After the decompression process is performed, the replay process is performed in sequence by the originally stored data rearranged in original order.

In order to start the replay process, an arbitrary data of either a P-picture or a B-picture, such as the data of the B-picture B13, is designated by a control mean. However, the B-picture B13 cannot be decompressed without the data of the P-picture P14, since the B-picture B13 has Bidirectionally-predicted data.

Therefore, to obtain the data of the P-picture P14, the replay process is performed from the I-picture 12 included in the same GOP containing the designated B-picture B13, or from other I-picture included in the next GOP. A method of the replay starting from a designated picture is disclosed in the Japanese Patent Laid-Open Publication No. 8-205083 in which a decompression process is performed while a still picture is displayed on a display monitor. In the case of this prior art, the decompression process is performed from the I-picture of the GOP which includes the designated picture. Then the following P-pictures and/or B-pictures are decompressed until the decompression process reaches to the designated picture. As shown in FIG. 18, the designated picture is displayed until the following picture of the designated picture is decompressed.

However, since the apparatus for decompressing the compressed data of prior art has to decompress the previous I-picture and all of the P-pictures and the B-pictures that are included in the GOP containing the designated picture, it is required to take time interval to replay the designated picture. In addition, because of performing the decompression process of each fame data (i.e. the previous I-pictures and the previous P-pictures necessary to decompress the designated picture) synchronously with the timing of displaying the picture, hereinafter simply referred to as "display timing", the decompression process of pictures cannot be started until the next display timing, it is required to take time interval for starting the decompression of the designated picture.

Furthermore, the apparatus for decompressing the compressed data of the prior art requires frame memories for storing I-pictures, P-pictures and B-pictures used in the decompression process and for storing the frame data of a picture to be displayed while each compressed data is decompressed. As a result, such apparatus tends to be large in scale and expensive.

SUMMARY OF THE INVENTION

It is an object of the present invention to provide an apparatus which can decompress compressed data at a high speed after a picture being designated to be decompressed without decompressing the previous B-pictures included in the GOP containing the designated picture.

It is another object of the present invention to provide an apparatus which can decompress compressed data at a high speed by continuously decompressing compressed data asynchronously with the display timing.

It is a further object of the present invention to provide an apparatus which does not require frame memories necessary for the decompressing compressed data without the decompression process of the B-pictures except for the designated B-picture.

It is a still further object of the present invention to provide a method which can decompress compressed data at a high speed after a picture being designated to be decompressed without decompressing the previous B-pictures included in the GOP containing the designated picture.

It is a yet further object of the present invention to provide a method which can decompress compressed data at a high speed by continuously decompressing compressed data asynchronously with the display timing.

It is a still yet further object of the present invention to provide a method which does not require frame memories necessary for the decompressing compressed data without the decompression process of the B-pictures except for the designated B-picture.

In accordance with a first aspect of the present invention, there is provided an apparatus for decompressing compressed data including a plurality of groups of compressed pictures, comprising: recording means including at least one random access memory for recording the compressed data, reading means for reading the compressed data from the recording means, decompressing means for decompressing the compressed data read from the recording means by the reading means, at least one frame memory for storing the decompressed data produced by the decompressing means, picture designating means for designating the compressed picture to be decompressed, control means for controlling the reading means by specifying the group of the compressed pictures to be read from the recording means by the recording means based on the picture designated by the picture designating means, and for controlling the decompressing means by transmitting the data relating to the designated picture designated by the picture designating means.

In the apparatus, each of the groups of compressed pictures may contain at least one Intra-coded picture and Predictive-coded pictures.

In the apparatus, the reading means may be operated to read the group of compressed pictures containing the pictures designated by the picture designating means.

In the apparatus, the decompressing means may be operated to decompress the Intra-coded picture included in the group of compressed pictures read by the reading means and the Predictive-coded picture which may be inserted between the picture designated by the picture designating means and the Bidirectionally-coded picture included in the group of compressed pictures read by the reading means under the state that the Predictive-coded picture is selected as the picture designated by the picture designating means.

In the apparatus, the picture designated by the picture designating means may be decompressed by the decompressing means under the state that the decompressed Predictive-coded picture is immediately before the picture designated by the picture designating means.

In the apparatus, each of the groups of compressed picture may contain at least one Intra-coded picture, Predictive-coded pictures, and Bidirectionally-coded pictures.

In the apparatus, the reading means may be operated to read the group of compressed pictures containing the picture designated by the picture designating means.

In the apparatus, the decompressing means may be operated to decompress the Intra-coded picture included in the group of compressed pictures read by the reading means and the Predictive-coded picture which may be inserted between the picture designated by the picture designating means and the Bidirectionally-coded picture included in the group of compressed pictures read by the reading means under the state that the Bidirectionally-coded picture is selected as the picture designated by the picture designating means.

In the apparatus, the picture designated by the picture designating means may be decompressed by the decompressing means under the state that the decompressed Predictive-coded picture is immediately before the picture designated by the picture designating means.

Alternatively, the apparatus may comprise displaying means for displaying a picture with said decompressed data stored in the frame memory.

Alternatively, the frame memory may include first and second memory sections.

In the apparatus, each decompressed data produced by the decompressing means with or without the data stored in said first and second memory sections may be respectively stored in said second and first memory sections.

Alternatively, the frame memory may further include a third memory section for storing the data for displaying a picture while the compressed data is decompressed by the decompressing means.

In the apparatus, one of the three memory sections may be controlled by the control means to store the data decompressed immediately before the designated picture designated by the picture designating means.

In the apparatus, the displaying means may be controlled to display the pictures decompressed immediately before the designated picture.

In the apparatus, the decompressing means may be controlled to decompress the compressed data using the two other memory sections except for the memory section selected to store the data decompressed immediately before the designated picture designated by the picture designating means.

In the apparatus, each compressed data may be decompressed asynchronously with the timing of displaying the pictures.

In accordance with a third aspect of the present invention, there is provided a method of decompressing compressed data including a plurality of groups of compressed pictures, the compressed data being stored in a recorder having at least one random access memory for recording the compressed data, comprising the steps of: reading the compressed data from the recorder, decompressing the compressed data read from the recorder, storing the decompressed data, designating the compressed picture to be decompressed, and controlling the step of reading by specifying the group of compressed pictures to be read based on the picture designated in the step of designating and controlling the step of decompressing by transmitting the data relating to the picture designated in the step of designating.

In the method, each of the groups of compressed pictures may contain at least one Intra-coded picture and Predictive-coded pictures.

In the method, the group of compressed pictures containing the picture designated in the step of designating may be read in the step of reading.

In the method, the Intra-coded picture included in the read group of compressed pictures and the Predictive-coded picture between the picture designated in the step of designating and the intra-coded picture included in the group of compressed pictures may be decompressed under the state that the Predictive-coded picture is selected as the picture designated in the step of designating.

In the method, the picture designated in the step of designating may be decompressed under the state that the decompressed Predictive-coded picture is immediately before the picture designated in the step of designating.

In the method, each of the groups of compressed pictures may contain at least one Intra-coded picture and Predictive-coded pictures.

In the method, the group of compressed pictures containing the picture designated in the step of designating may be read.

In the method, the intra-coded picture included in the read group of compressed pictures and the Predictive-coded picture between the picture designated in the step of designating and the Intra-coded picture included in the group of compressed pictures may be decompressed under the state that the Bidirectionally-coded picture is selected as the picture designated in the step of designating.

In the method, the picture designated in the step of designating may be decompressed on the basis of the decompressed Predictive-coded picture immediately before the picture designated in the step of designating.

Alternatively, the method may comprise the steps of displaying a picture with the decompressed data stored in the frame memory.

In the method, the frame memory may include first and second memory sections.

In the method, the step of storing may comprise the step of storing the decompressed data in the first memory section, the step of storing the decompressed data produced with the data stored in the first memory section in the second memory section, and storing the decompressed data produced with the data stored in the second memory section in the first memory section.

In the method, the frame memory may further include a third memory section for storing the data of the decompressed picture while the compressed data is decompressed in the step of decompressing.

In the method, the one of the three memory sections may be operated to store the data decompressed immediately before the designated picture in the event of a picture being designated in the step of designating.

In the method, the decompressed picture stored in the memory section selected to store the data decompressed immediately before the designated picture may be displayed while the compressed data may be decompressed in the step of decompressing.

In the method, the step of decompressing may be performed with two other memory sections except for the selected memory section selected to store the data decompressed immediately before the designated picture.

In the method, the each compressed data may be decompressed asynchronously with the timing of displaying the picture.

BRIEF DESCRIPTION OF THE DRAWINGS

The present invention and many of the advantages thereof will be better understood from the following detailed description when considered in connection with the accompanying drawings, wherein:

FIG. 8 is a block diagram showing a third preferred embodiment of the compressed data decompressing apparatus according to the present invention;

FIG. 16 is a schematic diagram showing a timing chart of decompressing compressed data according to the sixth preferred embodiment of the present invention;

DESCRIPTION OF THE PREFERRED EMBODIMENTS

The preferred embodiments of the apparatus for decompressing compressed data according to the present invention will be described hereinafter with reference to FIGS. 1 to 21. In the present invention, the compressed data includes a plurality of GOPs respectively containing at least one I-picture, P-pictures and B-pictures to be decompressed.

Figure 1:
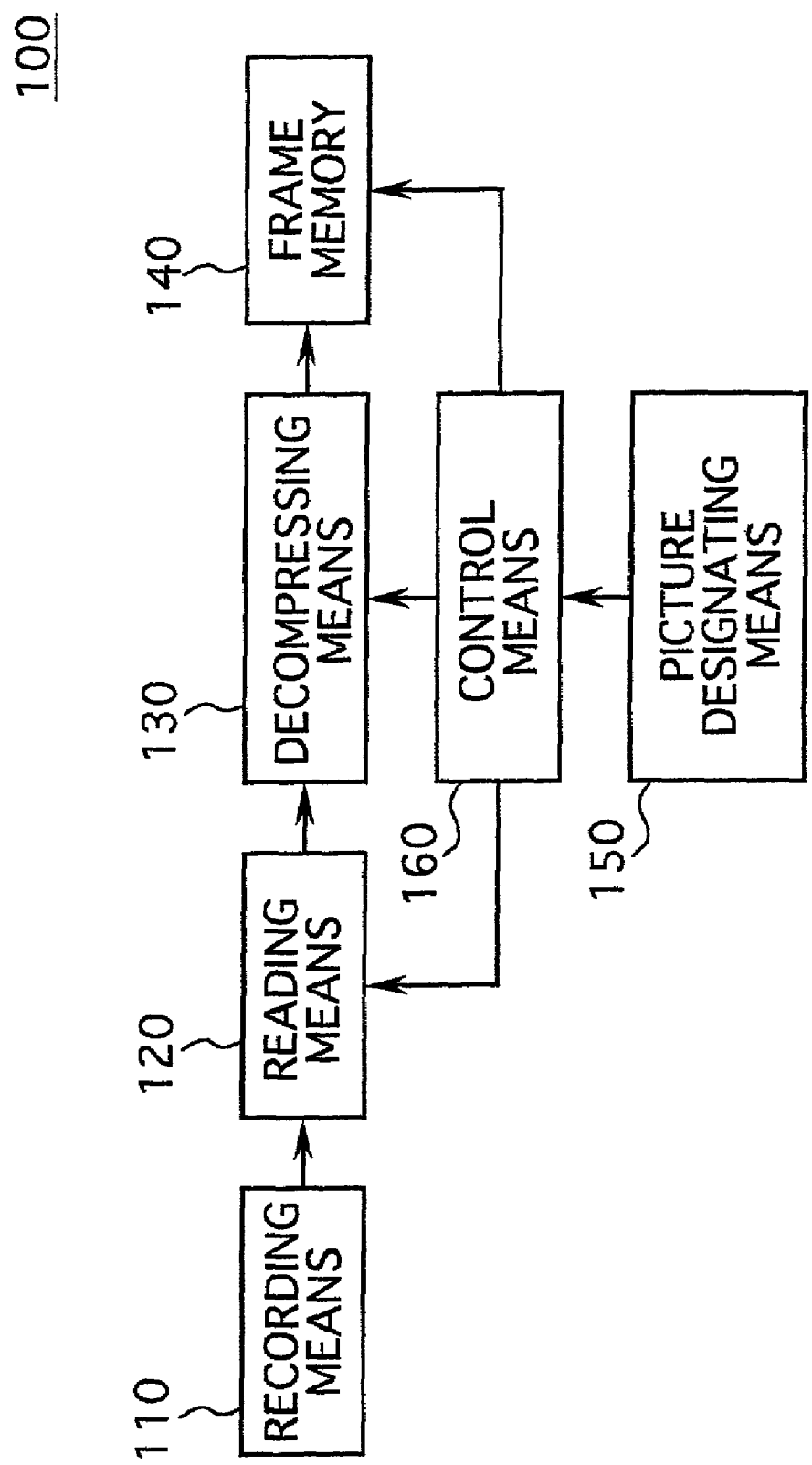
FIG. 1 is a block diagram showing a first preferred embodiment of the compressed data decompressing apparatus according to the present invention.
Figure 2:
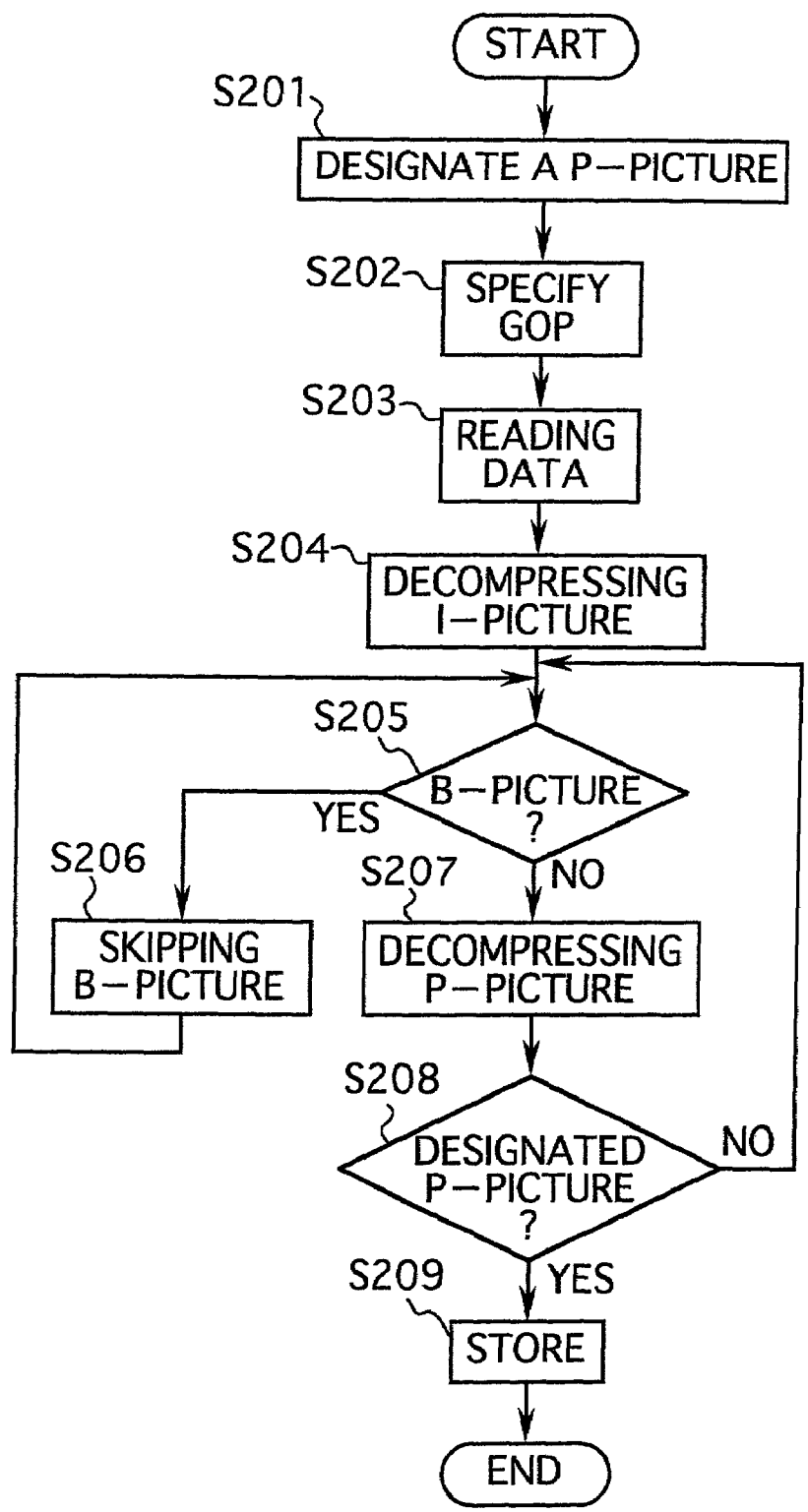
FIG. 2 is a flowchart of the process in the method of decompressing compressed data according to the present invention.
Figure 3:
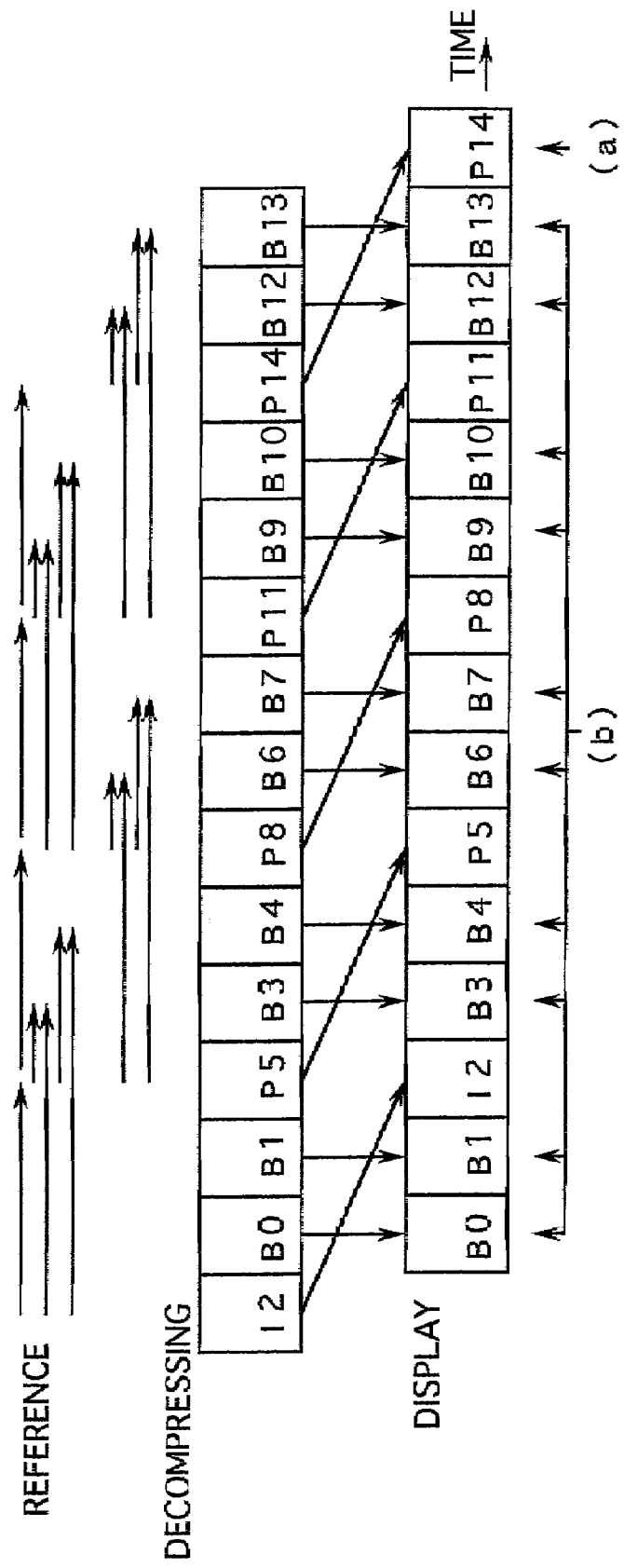
FIG. 3 is a schematic diagram showing an example of the relations among the reference pictures and the decompression process of the prior art.

Referring now to FIGS. 1 to 4, there is shown a first preferred embodiment of the compressed data decompressing apparatus according to the present invention. Specifically, an example of the compressed data to be decompressed is schematically shown in FIG. 3, in which at least one I-picture in the GOP is inserted to enable the random access to read each GOP in any order.

The compressed data decompressing apparatus 100 is shown in FIG. 1 to comprise recording means 110, reading means 120, decompressing means 130, a frame memory 140, picture designating means 150, and control means 160. The recording means 110 is designed to record the compressed data to be decompressed by the decompressing means 130. The recording means 110 includes at least one random access memory for recording the compressed data in order to enable the random access to read each GOP in any order. The reading means 120 is adapted to read the compressed data transmitted from the recording means 110 to be decompressed by the decompressing means 130. The decompressing means 130 is operated to decompress the compressed data read from the recording means 110 by the reading means 120. The frame memory 140 is operated to store the decompressed data produced by the decompressing means 130. The picture designating means 150 is designed to designate a target picture to be decompressed by the decompressing means 130. The data relating to the targeted picture designated by the picture designating means 150 is transmitted to the control means 160. Based on the designated picture, the control means 160 is operated to control the reading means 120 by specifying the compressed GOP including the designated picture and also to control the decompressing means 130 by transmitting the data relating to the designated picture.

As shown in FIG. 2, the flow of process for decompressing compressed data according to the first preferred embodiment of the present invention comprises steps S201 to S209. In step S201, the picture designating means 150 designates a P-picture. In step S202, the data of the group of compressed pictures is specified by the control means 160 to be read from the recording means 110 based on the designated picture, i.e. the picture designated in step S201, and the data relating to the designated picture is transmitted to the decompressing means 130 by the control means 160. In step S203, the data of the GOP specified in step S202 containing the designated P-picture is read by the reading means 120. In step S204, the I-picture contained in the GOP specified in step S202 is decompressed by the decompressing means 130. The I-picture may be identified based on the data of the I-picture and the data of the arrangement of each picture within the GOP. After the decompression of the I-picture, the B-picture following the I-picture can be decompressed by the decompressing means 130. In step S205, the decompressing means 130 is operated to determine whether the current picture is a B-picture or not. When the current picture is determined to be a B-picture, the decompression process goes to step S206. In case of the current picture being determined not to be a B-picture, the decompression process goes to step S207. In step S206, the decompression process of the B-picture is skipped and the process returns to step S205 and repeats these steps described above with the next picture. In step S207, the P-picture is decompressed by the decompressing means 130 as the current picture is determined to be the P-picture. In step S208, the decompressing means 130 is operated to determine whether the designated P-picture is the current picture or not. When the designated P-picture is determined to be the current picture, the decompression process skips to step S209. In the case of the designated P-picture being determined not to be the current picture, the process returns to step S205 and repeats these steps described above with the next picture. In step S209, the frame memory 140 is operated to store the designated picture decompressed by the decompressing means 130, and then the decompressing process is terminated.

Referring to FIG. 3, there is shown an example of the conventional order of the decompression process is shown in FIG. 3 with an array of the rectangles labeled "DECOMPRESSING". The order of displaying the pictures is indicated by an array of the rectangles labeled "DISPLAY". On the top of FIG. 3, there is shown a plurality of arrows respectively referring pictures. In other words, the pictures are referred by the arrows and pictures situated at the origin of arrows. The picture referred by the arrows is a targeted picture to be decompressed, hereinafter referred to as a targeted picture, and the pictures situated at the origin of the arrows are those necessary to decompress the targeted picture, hereinafter simply referred to as "referencing pictures" of the targeted picture. For example, the I-picture I2 and the P-picture P5 are the referencing pictures of the targeted B-picture B3, that is, the B-picture B3 is decompressed through referring the I-picture I2 and the P-picture P5.

Figure 4:
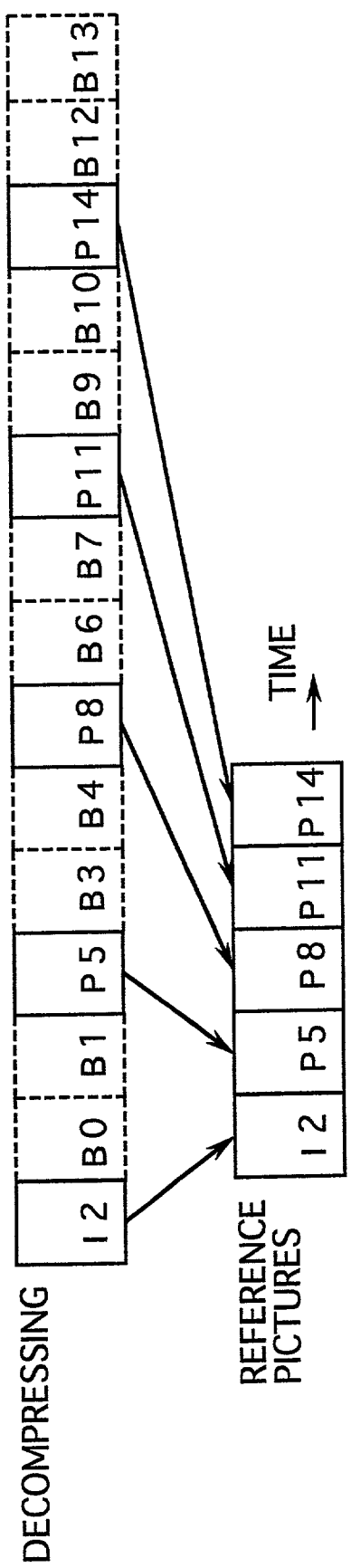
FIG. 4 is a schematic diagram showing a first preferred embodiment of the compressed data decompressing process according to the present invention.

In the present preferred embodiment, the P-picture is designated by the picture designating means 150. For example, as shown in FIG. 3, when the P-picture P14 labeled (a) is designated, the P-picture P14 is decompressed by the referencing pictures I-picture I2 and the P-pictures P5, P8 and P 11 which can be certified by tracing the arrows pointing the P-picture P14. Therefore, it is possible to avoid referring each picture labeled (b), i.e. each B-picture, for the decompression of the P-picture P14. As shown in FIG. 4, the referencing pictures of the targeted P-picture 14 are illustrated as rectangles with solid lines in the array labeled "DECOMPRESSING". Therefore, the compressed data decompressing apparatus according to the first embodiment of the present invention can decompress the designated P-picture is at a high speed by skipping the decompression process of the previous B-pictures as compared with the prior art decompressing apparatus as seen in the conventional decompression process.

While it has been described in the first preferred embodiment of the compressed data decompressing apparatus according to the present invention that the P-picture is designated to be decompressed in the apparatus, the P-picture may be replaced by other picture such as the B-picture which decompress compressed data at a high speed with less frame memories according to the present invention.

As the construction of the second preferred embodiment of the compressed data decompressing apparatus is almost the same as the first preferred embodiment of the compressed data decompressing apparatus, the following description will be directed only to the process of the elements and parts of the second preferred embodiment. Description about the same process of the second preferred embodiment as those of the first preferred embodiment will be omitted to avoid tedious repetition but the same reference numerals are given in FIG. 5 for the process of the second preferred embodiment as those of the first preferred embodiment in FIG. 2.

Figure 5:
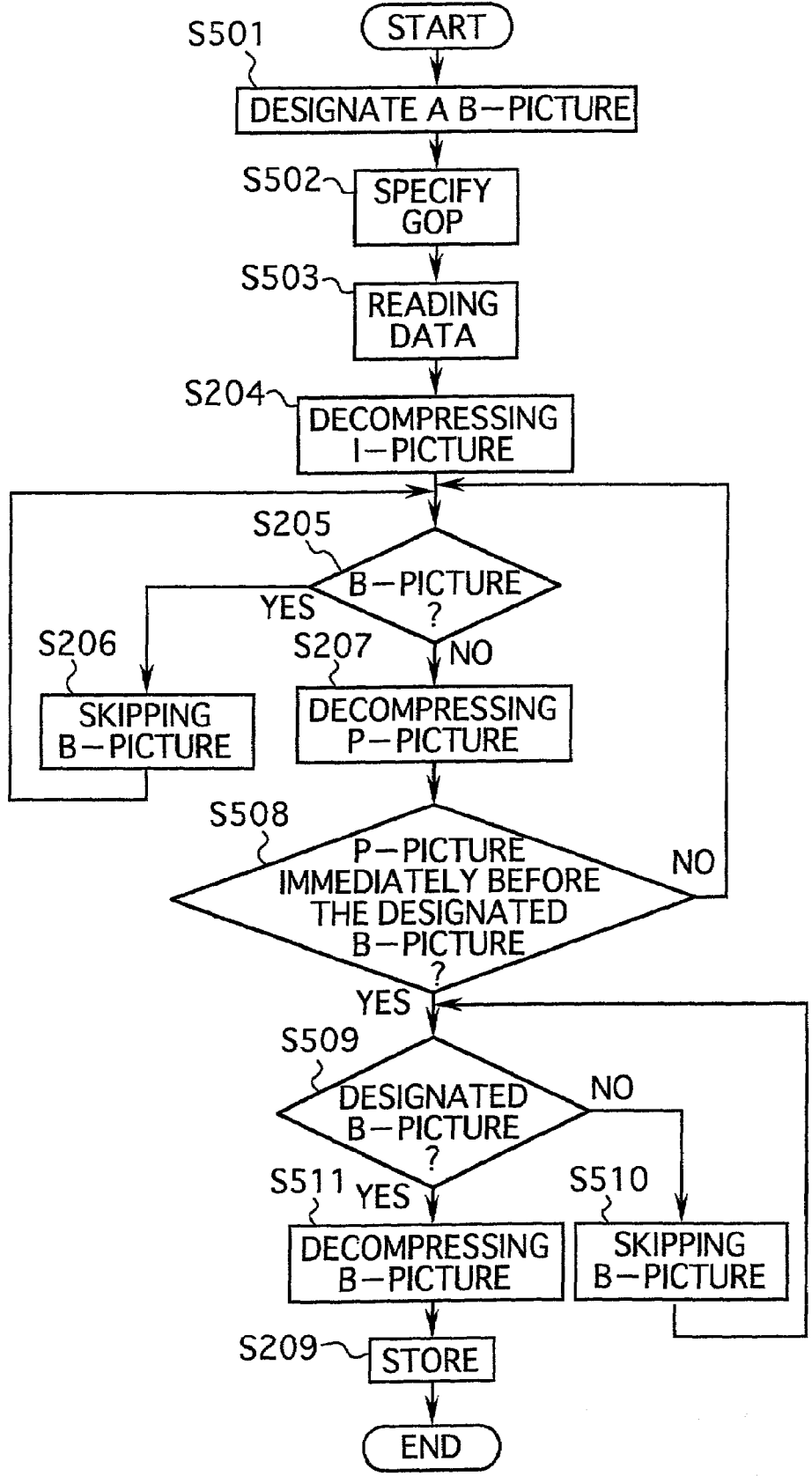
FIG. 5 is a flowchart of the process in the method of decompressing compressed data according to the first preferred embodiment of the present invention.
Figure 6:
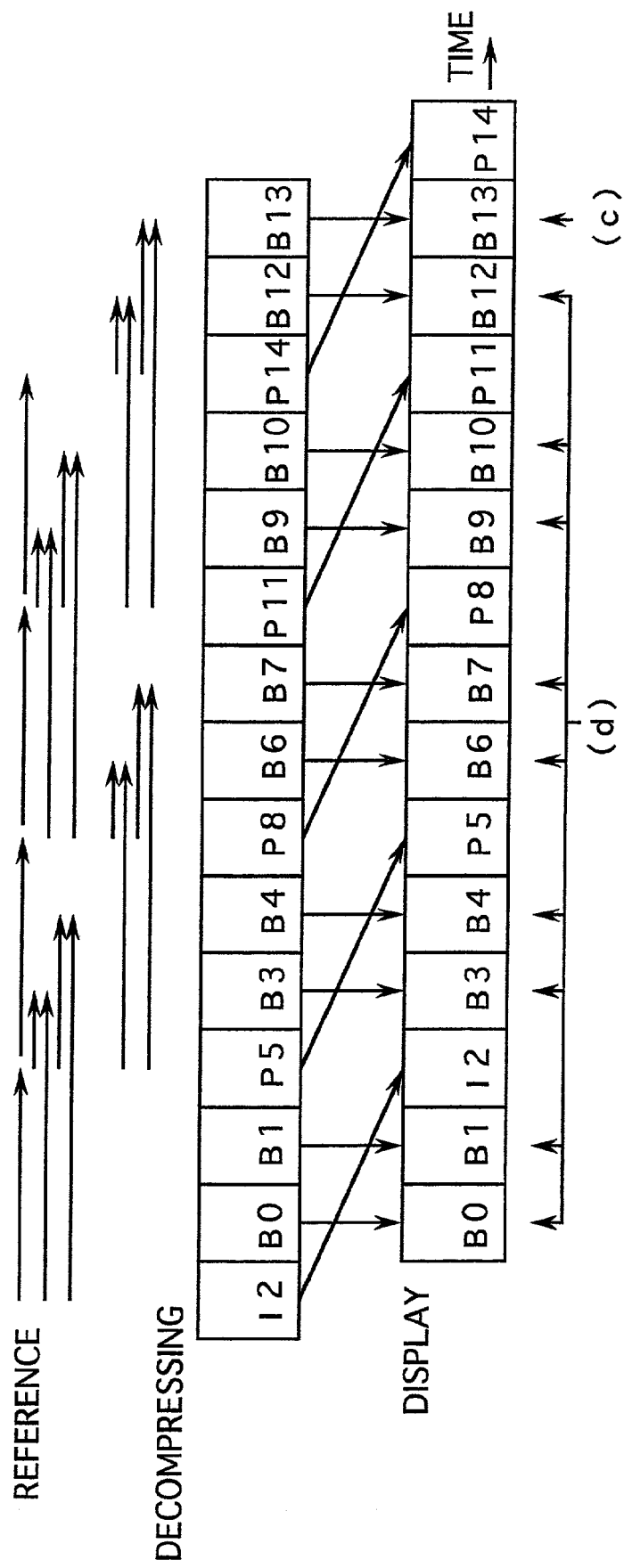
FIG. 6 is a schematic diagram showing an example of the relations among the reference pictures and the decompression process of the prior art.
Figure 7:
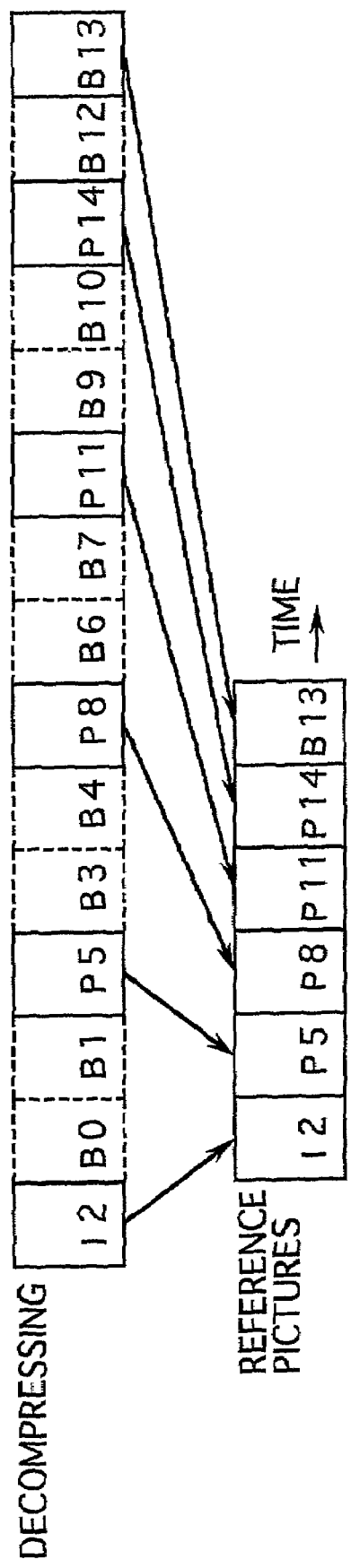
FIG. 7 is a schematic diagram showing a second preferred embodiment of the compressed data decompressing process according to the present invention.

Referring to FIG. 5 to FIG. 7, there is shown a second preferred embodiment of the compressed data decompressing apparatus according to the present invention. In the present preferred embodiment, a B-picture is selected as a designated picture by the picture designating means 150. The data of the designated B-picture is transmitted to the control means 160. Based on the designated B-picture, the control means 160 controls the reading means 120 by specifying the compressed GOP including the designated B-picture and also controls the decompressing means 130 by transmitting the data relating to the designated B-picture.

In FIG. 5, there is shown the flow of a process for decompressing compressed data according to the second preferred embodiment of the present invention. In step S50 1, the B-picture is selected as a designated picture by the picture designating means 150. In step S502, the control means 160 specifies the group of compressed pictures to be read from the recording means 110 based on the designated B-picture selected in step S501 and transmits the data relating to the designated B-picture to the decompressing means 130. In step S503, the data of the specified GOP containing the designated B-picture is read by the reading means 120. From step S204 to step S207, the similar process is performed as those described in the first preferred embodiment. In step S508, the decompressing means 130 is operated to determine whether the current picture is the P-picture immediately before the designated B-picture or not. When the current picture is determined to be the P-picture immediately before the designated B-picture, the decompression process goes to step S509. In the case of the current picture being determined not to be the P-picture immediately before the designated B-picture, the decompression process returns to step S205 and repeats these steps described above with the next picture. In step S509, whether the next picture of the current picture is the designated B-picture or not is determined by the decompressing means 130. When the current picture is determined to be the designated B-picture, the decompression process goes to step S511. In the case of the current picture being determined not to be the designated B-picture, the decompression process goes to step S510. In step S510, the decompression process of the B-picture is skipped and the process returns to step S509 and repeats these steps described above with the next picture. In step S511, as the current picture is determined to be the designated B-picture, the decompression process of the current picture is performed. In step S209, the frame memory 140 is operated to store the data relating to the designated picture decompressed by the decompressing means 130, and then the process is terminated.

Referring to FIG. 6, there is shown an example of the conventional order of the decompression process with an array of the rectangles labeled "DECOMPRESSING". The order of displaying the pictures is indicated by an array of the rectangles labeled "DISPLAY". In the top of FIG. 3, there is shown a plurality of arrows which respectively referring the decompressing targeted picture and the reference pictures of the decompressing targeted picture.

In the present preferred embodiment, a B-picture is selected as a designated picture by the picture designating means 150. For example, as shown in FIG. 6, when the B-picture B13 labeled (c) is selected as a designated picture, the decompression of the B-picture B13 is performed through referencing the I-picture I2 and the P-pictures P5, P8 and P11 which can be certified by tracing the arrows pointing the B-picture B13. Therefore, it is possible to avoid referring each picture labeled (c) in the FIG. 6, i.e. the previous B-picture including the B-picture B12 between the P-picture immediately before the designated B-picture B12 and the designated B-picture, for the decompression of the B-picture B13. As shown in FIG. 7, the referencing pictures of the targeted B-picture B13 are illustrated as rectangles with solid lines in the array labeled "DECOMPRESSING". Therefore, the designated B-picture is decompressed at a high speed by skipping the decompression process of the previous B-pictures by skipping the decompression process of the previous B-pictures including the B-picture between the P-picture immediately before the designated B-picture and the previous B-picture.

As the construction of the third preferred embodiment of the compressed data decompressing apparatus is almost the same as the first preferred embodiment of the compressed data decompressing apparatus, the following description will be directed only to the process of the elements and parts of the third preferred embodiment. Description about the same process of the third preferred embodiment as those of the first preferred embodiment will be omitted to avoid tedious repetition but the same reference numerals are given in FIG. 8 for the process of the third preferred embodiment as those of the first preferred embodiment in FIG. 1.

Figure 9:
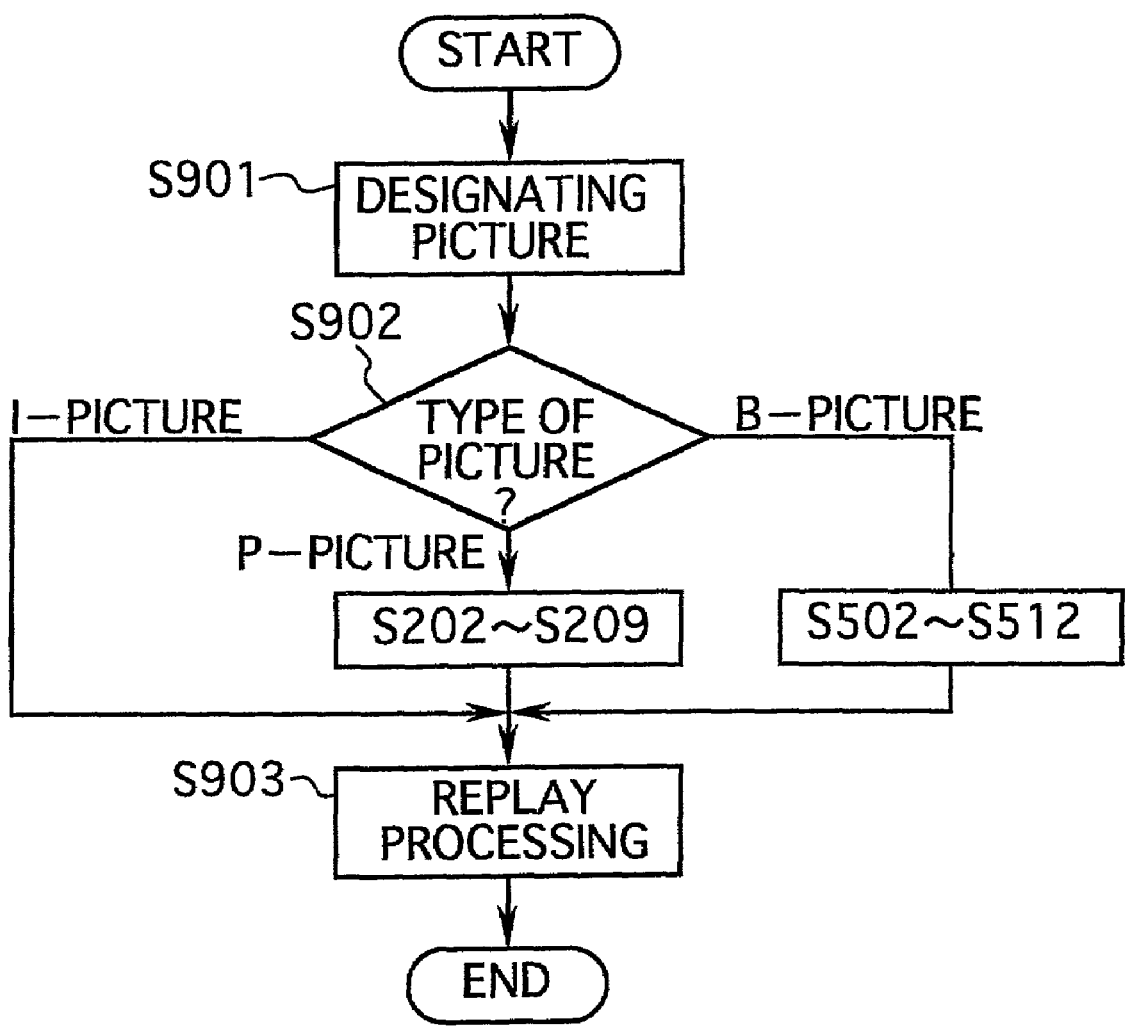
FIG. 9 is a flowchart of the process in the method of decompressing compressed data according to the third preferred embodiment of the present invention.

Referring to FIG. 8 and FIG. 9, there is shown a third preferred embodiment of a compressed data decompressing apparatus according to the present invention. As shown in FIG. 8, the present compressed data decompressing apparatus further includes displaying means 870 in addition to the compressed data decompressing apparatus shown in FIG. 1 in the first preferred embodiment. The displaying means 870 is designed to display pictures with the decompressed data stored in the frame memory 140.

In FIG. 9, there is shown the flow of a process for decompressing compressed data according to the third preferred embodiment of the present invention. In step S901, the picture designating means 150 designates an arbitrary picture. In step S902, the control means 160 is operated to control the picture designating means 150 to classify the arbitrary picture designated by the picture designating means 150 into three types of pictures, i.e. an I-picture, a P-picture and a B-picture mentioned above. When the arbitrary picture is classified into an I-picture by the picture designating means 150, the process goes to step S903. In the case of the arbitrary picture being classified into a P-picture by the picture designating means 150, the process goes to steps from step S202 to step S209 and then goes to step S903. In the case of the arbitrary picture being classified into a B-picture by the picture designating means 150, the process goes to steps from step S502 to step S512 and then goes to step S903. In step S903, the replay process is performed and the picture is displayed with the designated picture decompressed by the decompressing means 130 and stored in the frame memory 140, and then the process is terminated. Therefore, the designated B-picture is decompressed at a high speed by skipping the decompression process of the previous B-pictures including the B-picture between the P-picture immediately before the designated B-picture and the previous B-pictures.

While it has been described in the previous preferred embodiments of the compressed data decompressing apparatus according to the present invention that two reference pictures are necessary to decompress the designated B-picture, it may be possible to decompress the B-picture with reducing the number of reference pictures according to the present invention.

As the construction of the fourth preferred embodiment of the compressed data decompressing apparatus is almost the same as the first preferred embodiment of the compressed data decompressing apparatus, the following description will be directed only to the process of the elements and parts of the fourth preferred embodiment. Description about the same process of the fourth preferred embodiment as those of the first preferred embodiment will be omitted to avoid tedious repetition but the same reference numerals are given in FIG. 10 for the process of the fourth preferred embodiment as those of the first preferred embodiment in FIG. 1.

Figure 10:
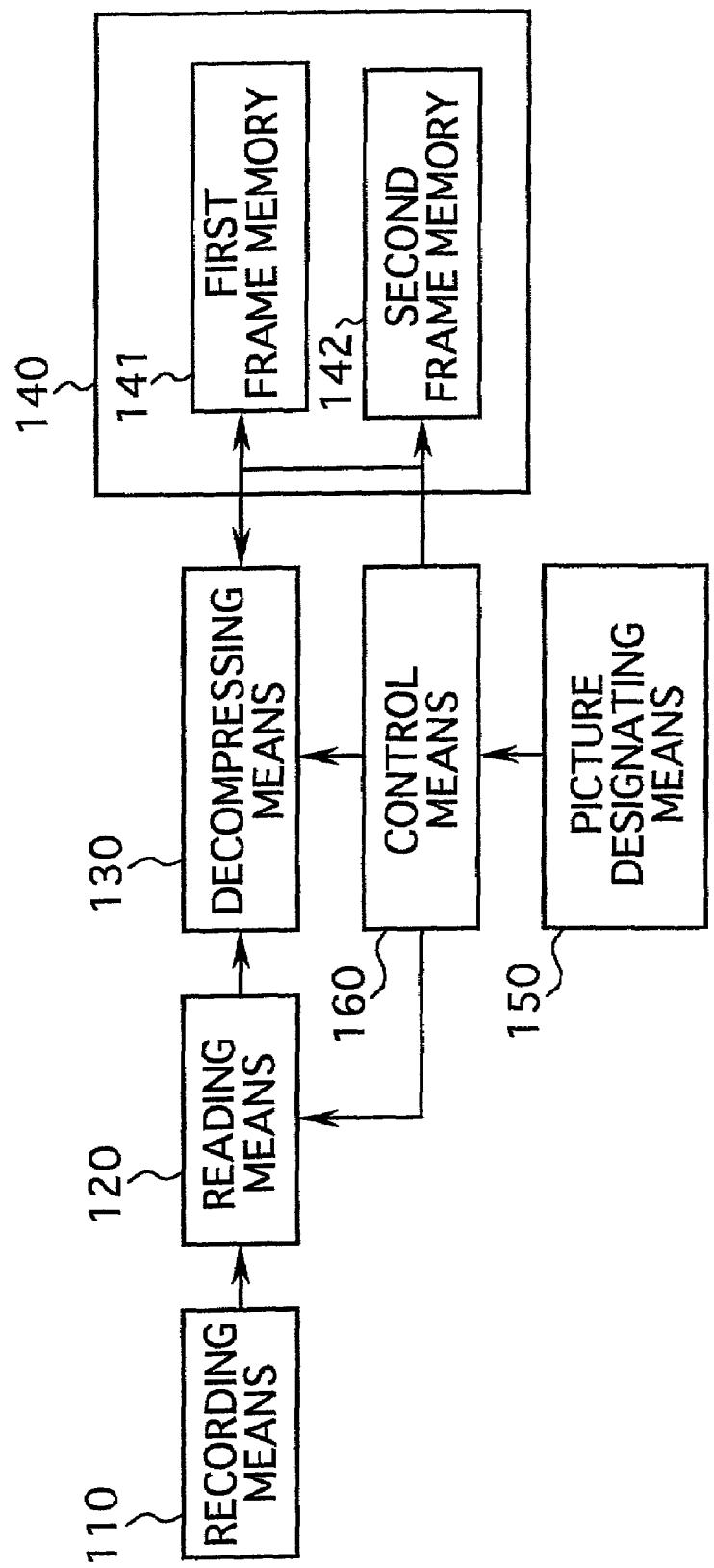
FIG. 10 is a block diagram showing a fourth preferred embodiment of the compressed data decompressing apparatus according to the present invention.
Figure 11:
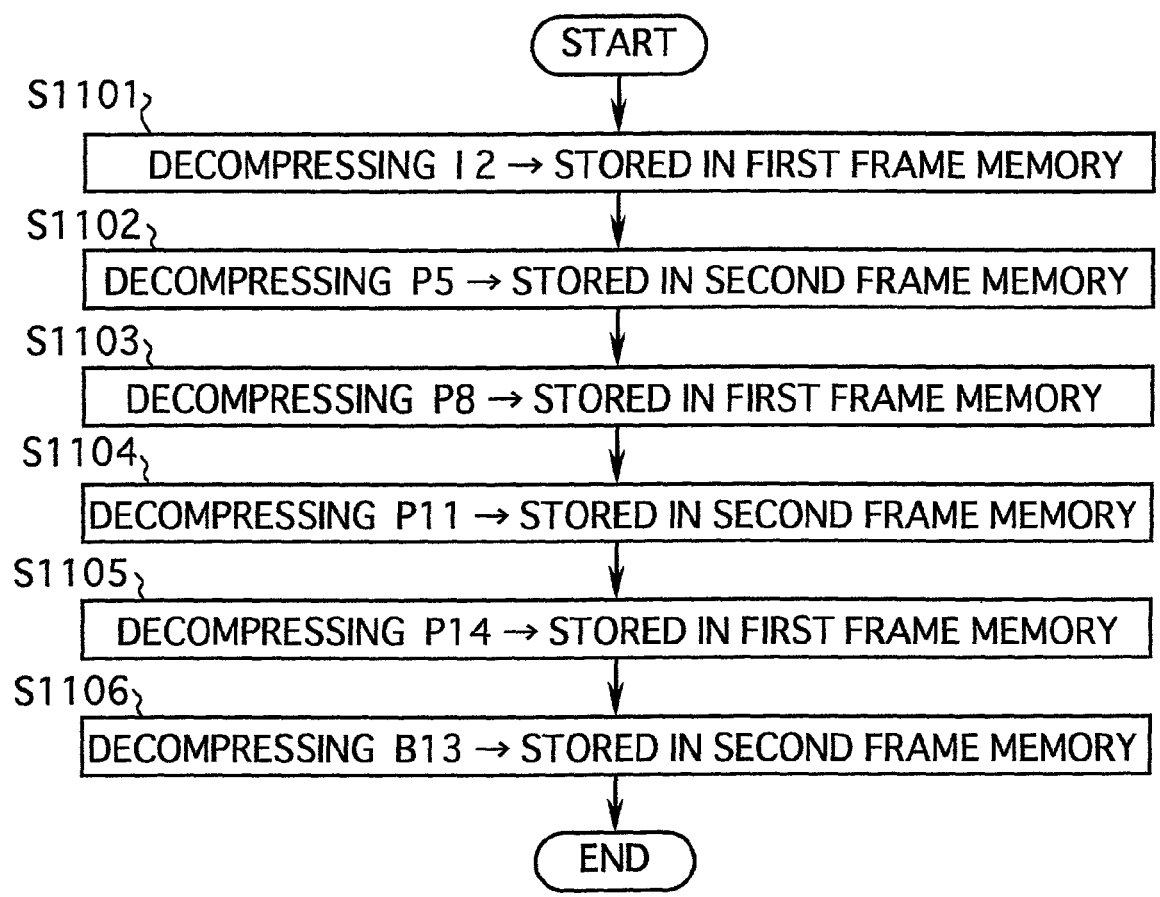
FIG. 11 is a flowchart of the process in the method of storing the decompressed pictures according to the fourth preferred embodiment of the present invention.
Figure 12:
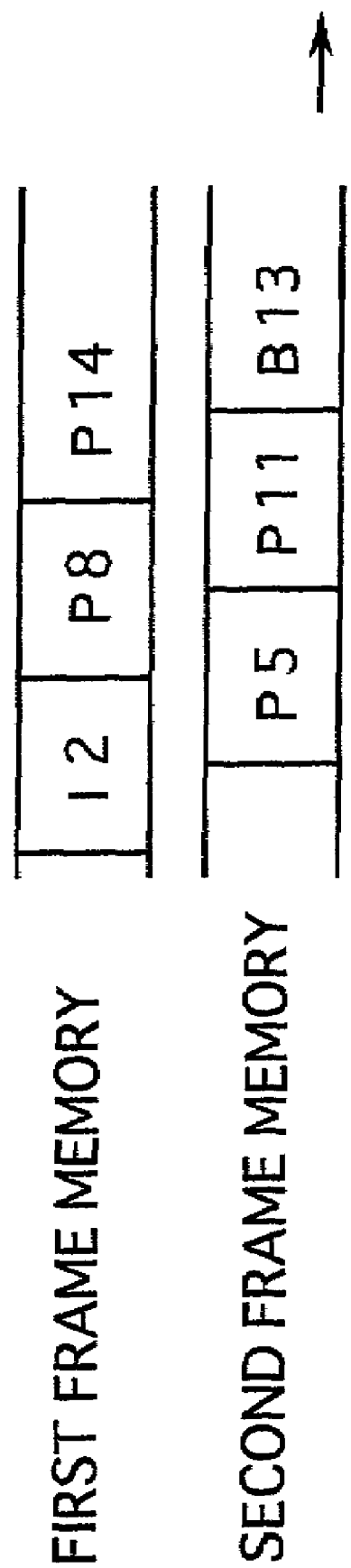
FIG. 12 is a schematic diagram showing a timing chart of recording according to the fourth preferred embodiment of the present invention.

Referring to FIG. 10 to FIG. 12, there is shown a fourth preferred embodiment of a compressed data decompressing apparatus according to the present invention. As shown in FIG. 10, the present compressed data decompressing apparatus further includes the first and second frame memory sections 141 and 142 for storing each decompressed picture produced by the decompressing means 130 alternatively.

In FIG. 11, there is shown the flow of a process for decompressing compressed data according to the fourth preferred embodiment of the present invention. The flow of the process shown in FIG. 11 is for decompressing the B-picture B13 shown in FIG. 7 and comprises steps S204 to S208 shown in FIG. 2.

In step S1101, the reference I-picture I2 is decompressed by the decompressing means 130 and the decompressed I-picture I2 is stored in the first frame memory section 141. In step S1102, the reference P-picture P5 next to the reference I-picture I2 is decompressed by the decompressing means 130 with referring to the decompressed I-picture I2 stored in the first frame memory section 141. The decompressed P-picture P5 is stored in the second frame memory section 142. In step S1103, the reference P-picture P8 next to the reference P-picture P5 is decompressed by the decompressing means 130 with referring to the decompressed P-picture P5 stored in the second frame memory section 142. The decompressed P-picture P8 is stored in the first frame memory section 141. In step S1104, the reference P-picture P11 next to the reference P-picture P8 is decompressed by the decompressing means 130 with referring to the decompressed P-picture P8 stored in the first frame memory section 141. The decompressed P-picture P11 is stored in the second frame memory section 142. In step S1105, the reference P-picture P14 next to the reference P-picture P11 is decompressed by the decompressing means 130 with referring to the decompressed P-picture P141 stored in the second frame memory section 142. The decompressed P-picture P14 is stored in the first frame memory section 141. In step S1106, the designated B-picture B13 is decompressed by the decompressing means 130 with referring to both the decompressed P-picture P11 stored in the second frame memory section 142 and the decompressed P-picture P14 stored in the first frame memory section 141 respectively. Finally, the decompressed B-picture B13 is stored in the second frame memory section 142.

In FIG. 12, there is shown a schematic diagram of timing for accessing the first frame memory section 141 and second frame memory section 142. The intervals for accessing the both first and second frame memory sections 141, 142 overlaps each other because of referencing to the I-picture or P-pictures for decompression.

According to the present fourth preferred embodiment, the present invention provides an apparatus and a method for decompressing compressed data which can decompress the designated picture at a high speed with reduced frame memories as compared with the prior art decompressing apparatus that requires to decompress B-pictures by referencing the decompressed reference P-pictures.

While it has been described in the fourth preferred embodiment of the compressed data decompressing apparatus according to the present invention that the elements and parts for decompressing compressed data are specified without referring the display meaning, it may be necessary to display a picture during the interval of the decompression steps.

Figure 13:
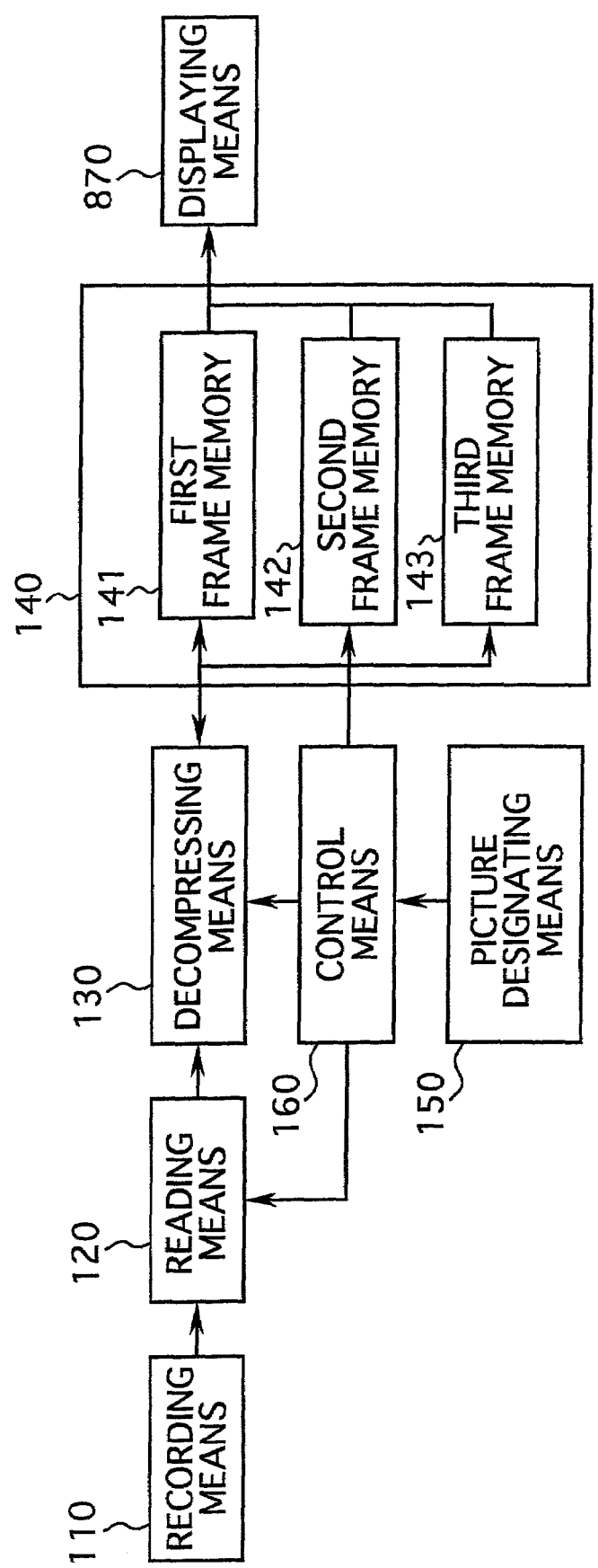
FIG. 13 is a block diagram showing a fifth preferred embodiment of the compressed data decompressing apparatus according to the present invention.

As the construction of the fifth preferred embodiment of the compressed data decompressing apparatus shown in FIG. 13 is almost the same as the fourth preferred embodiment of the compressed data decompressing apparatus, the following description will be directed only to the process of the elements and parts of the fifth preferred embodiment. Description about the same process of the fifth preferred embodiment as those of the fourth preferred embodiment will be omitted to avoid tedious repetition but the same reference numerals are given in FIG. 13 for the process of the fifth preferred embodiment as those of the fourth preferred embodiment in FIG. 10.

Referring to FIG. 13, there is shown a fifth preferred embodiment of a compressed data decompressing apparatus according to the present invention. As shown in FIG. 13, the present compressed data decompressing apparatus further includes displaying means 870, and third frame memory section 143 in the frame memory 140.

Figure 14:
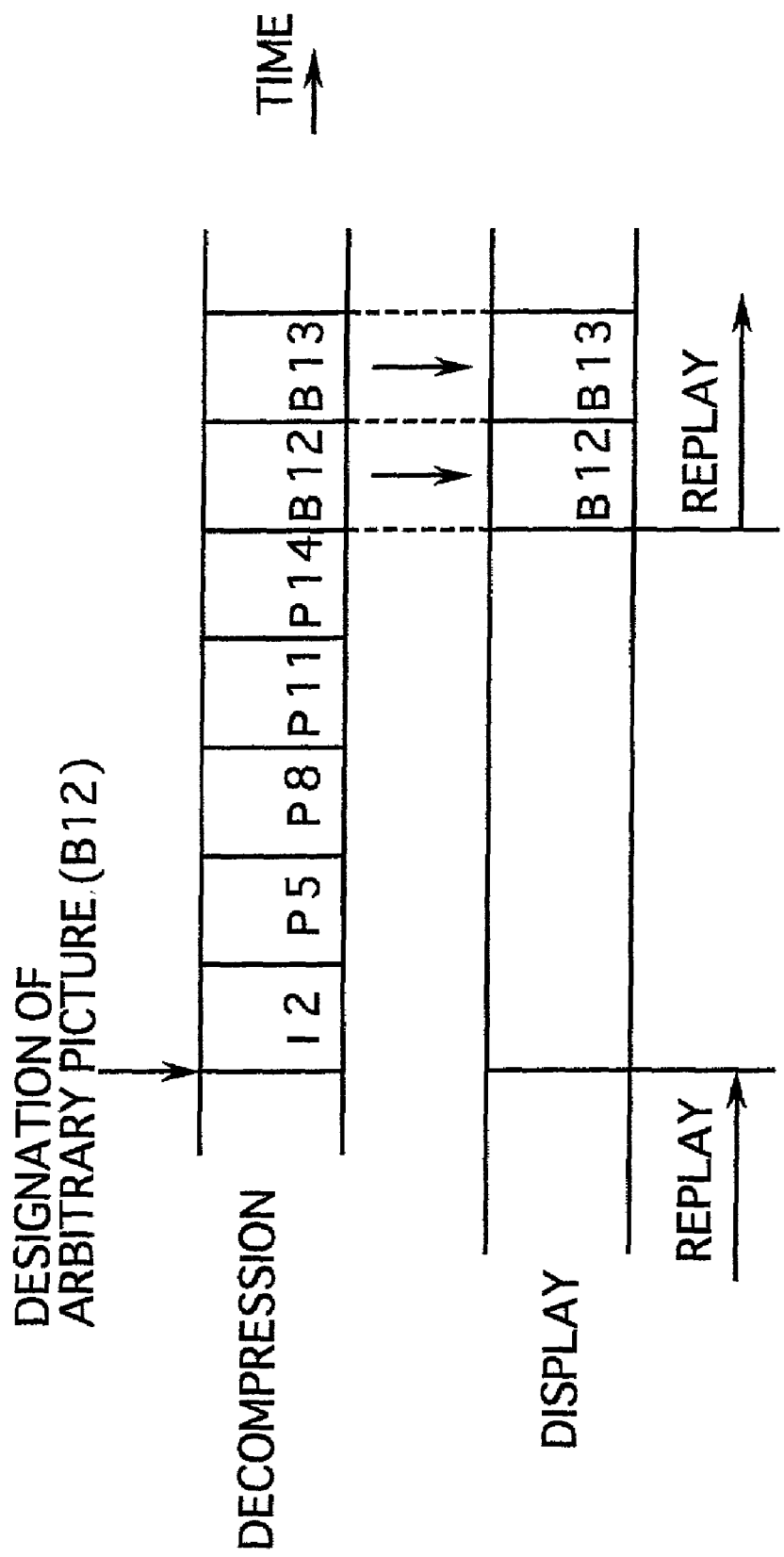
FIG. 14 is a schematic diagram showing a timing chart of displaying a picture according to the fifth preferred embodiment of the present invention.

When the picture designating means 150 designates an arbitrary picture, the control means 160 is operated to have one of the three frame memory sections 141, 142 or 143 store the data decompressed immediately before the designated picture, and to have the two other memory sections store the decompressed data. The displaying means 870 is operated to display pictures decompressed immediately before the designated picture. In FIG. 14, there is shown a schematic diagram of timing for displaying the picture stored in the selected frame memory section to store the data decompressed immediately before the designated picture with the timing for decompression process.

According to the present fifth preferred embodiment, the present invention provides an apparatus and a method for decompressing compressed data which can decompress the designated picture with displaying pictures by including the displaying means 870 and the third frame memory section to store the data decompressed immediately before the designated picture in the frame memory 140.

While it has been described in the previous preferred embodiments of the compressed data decompressing apparatus according to the present invention that the decompression process is performed synchronously with the timing of displaying pictures, it may be possible to decompress compressed data asynchronously with the timing of displaying pictures.

As the construction of the sixth preferred embodiment of the compressed data decompressing apparatus is almost the same as the fourth preferred embodiment of the compressed data decompressing apparatus shown in FIG. 10 other than the decompressing process is continuously performed asynchronously with the timing of displaying. The following description will be directed only to the timing of the decompression after a picture being designated by the picture designating means 150. Description about the elements and parts of the sixth preferred embodiment will be omitted to avoid tedious repetition.

Figure 15:
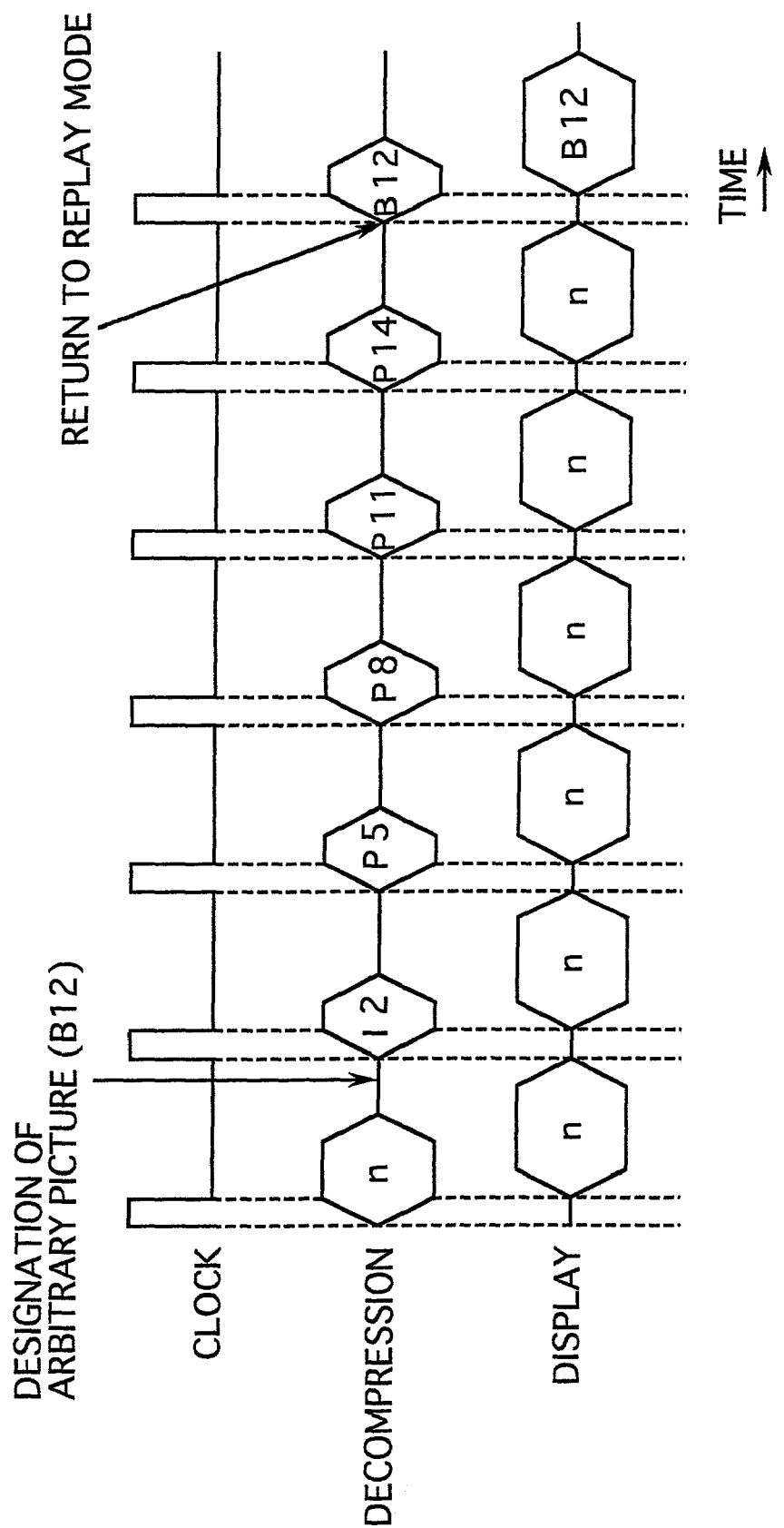
FIG. 15 is a schematic diagram showing a timing chart of decompressing compressed data of a prior art.
Figure 17:
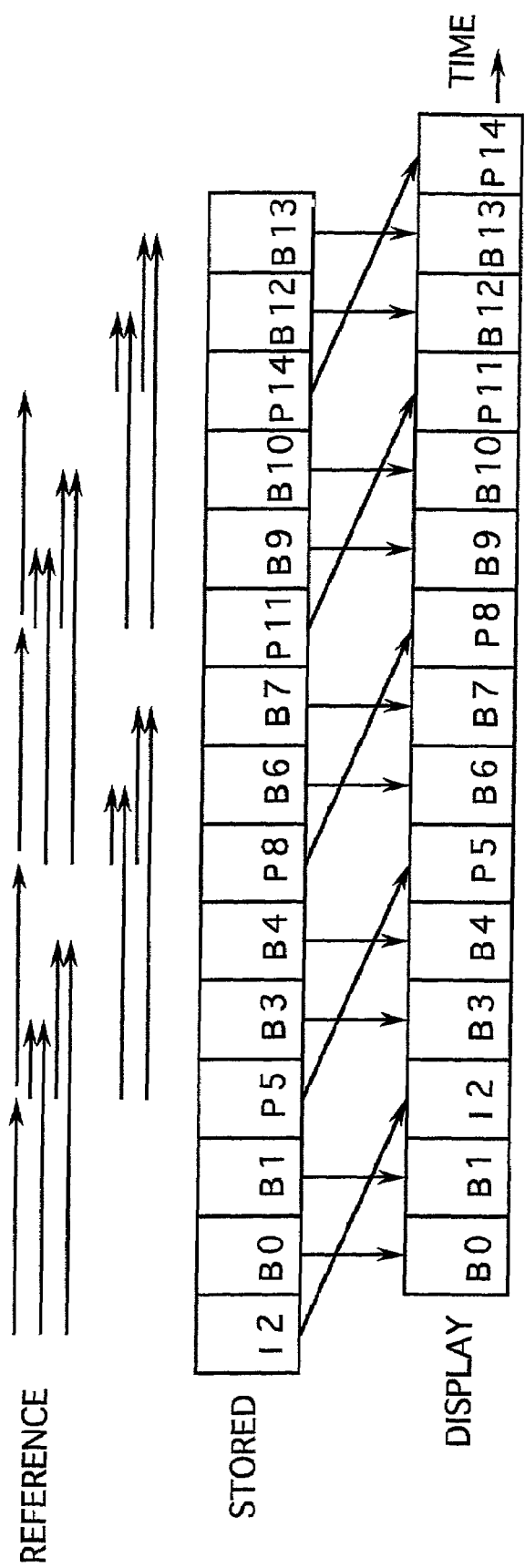
FIG. 17 is a schematic diagram showing an example of the order of the storing and displaying a picture of a prior art.
Figure 18:
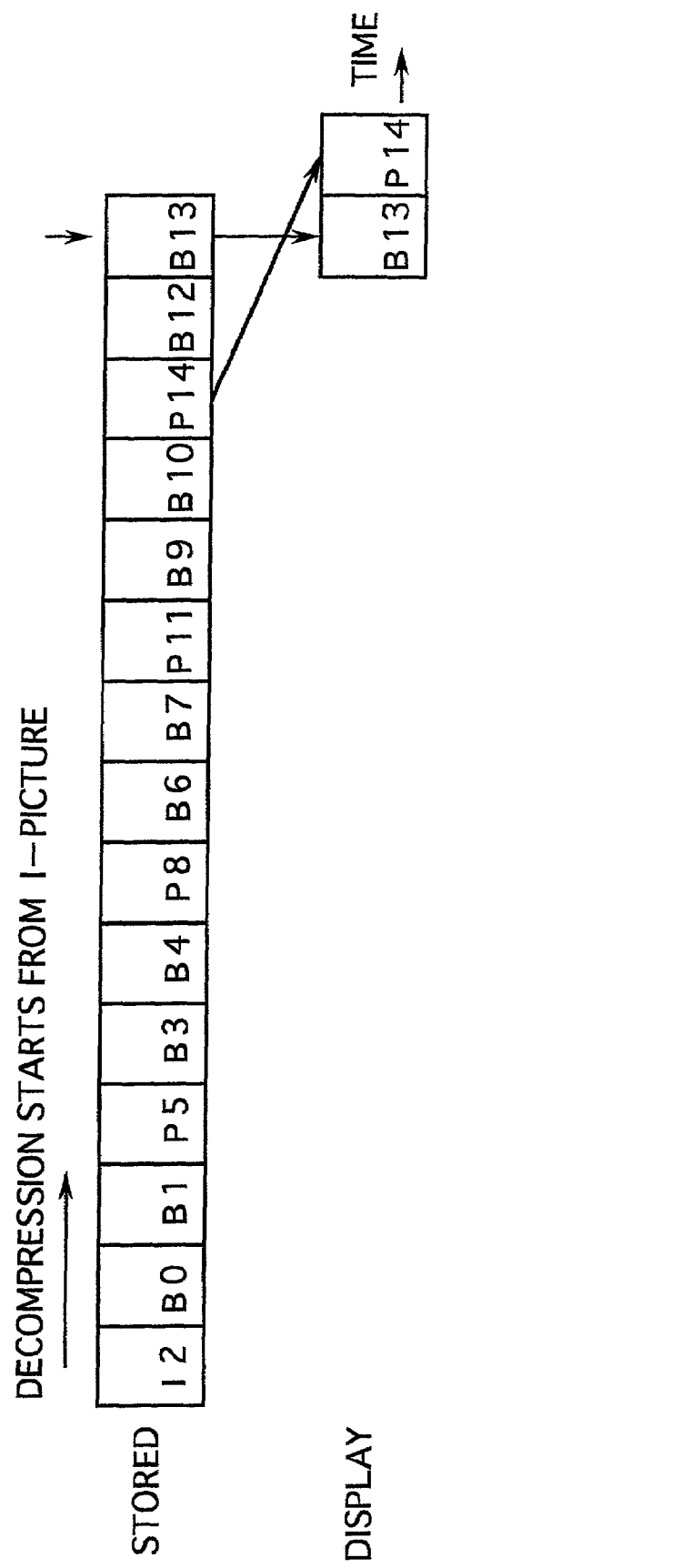
FIG. 18 is a schematic diagram showing a timing chart of decompressing compressed data of a prior art.

Referring to FIG. 15 and FIG. 16, the explanation of the timing for decompressing the compressed data will be described hereinafter. FIG. 15 shows a schematic diagram of the timing for decompression process of the prior art. As shown in FIG. 15, the decompression process of the prior art is performed synchronously with the timing of displaying pictures. On the contrary, as shown in FIG. 16, the decompression process of the present sixth embodiment is performed asynchronously with the timing of displaying pictures. Furthermore, the decompression process of the present sixth embodiment is performed continuously. When the decompression of the previous reference pictures of the designated picture such as the B-picture B12 in FIG. 16 is completed, the timing of the decompression of the next picture, i.e. the B-picture B12, returns to the clock timing for displaying pictures. This invention is also applicable to the apparatus of the fifth embodiment with similar asynchronous operation.

According to the present sixth preferred embodiment, the present invention provides an apparatus and a method for decompressing compressed data which can decompress the designated picture at a high speed as compared with the prior art decompressing apparatus by continuously performing the decompression process asynchronously with the timing of displaying pictures.

It will be appreciated from the above description that the compressed data decompressing apparatus according to the present invention has an advantage over the prior art in decompression speed by skipping the decompression steps of the previous pictures having been performed in the conventional decompression steps.

The many features and advantages of the invention are apparent from the detailed specification, and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described herein, and accordingly, all suitable modifications and equivalents may be construed as being encompassed within the scope of the invention.

What is claimed is:

1. An apparatus for decompressing compressed data including a group of coded pictures having at least one Intra-coded picture, Predictive-coded pictures, and Bidirectionally-coded pictures, comprising:

recording means for recording said compressed data;

reading means for reading said compressed data from said recording means, decompressing means for decompressing said compressed data read by said reading means from said recording means;

a frame memory portion for storing decompressed data decompressed by said decompressing means;

displaying means for displaying said decompressed data stored in said frame memory portion;

picture designating means for designating a coded picture; and control means for controlling said reading means to have said reading means read said coded picture designated by said picture designating means from said recording means and controlling said decompressing means to have said decompressing means decompress said coded picture read by said reading means, and in which said frame memory portion includes a first memory section for storing therein a picture decompressed by said decompressing means, and a second memory section for storing therein a picture immediately subsequent to said picture stored in said first memory section and decompressed by said decompressing means, said reading means being operative to read said Intra-coded picture, Predictive-coded pictures intervening between said Intra-coded picture and said coded picture designated by said picture designating means, and said coded picture designated by said picture designating means, said decompressing means being operative to assume two operating states including a Predictive-coded picture decompressing operating state, in which said decompressing means is operative to decompress, in sequence, said Intra-coded picture and said Predictive-coded pictures intervening between said Intra-coded picture and said coded picture designated by said picture designating means under the condition that said coded picture designated by said picture designating means is a Predictive-coded picture, and a Bidirectionally-coded picture reading operation state in which said decompressing means is operative to decompress in sequence said Intra-coded picture and said Predictive-coded pictures intervening between said Intra-coded picture and Predictive-coded picture read by said reading means immediately prior to said coded picture designated by said picture designating means, and then decompress said coded picture designated by said picture designating means on the basis of two of said Predictive-coded pictures decompressed immediately prior to said coded picture designated by said picture designating means under the condition that said coded picture designated by said picture designating means is a Bidirectionally-coded picture, and said control means is operative to control said displaying means operative to display said decompressed data stored in said frame memory portion asynchronously with the timing of said decompressing means.

2. An apparatus for decompressing compressed data as set forth in claim 1, and in which said frame memory portion further includes a third memory section for storing said data to be displayed by said displaying means while the compressed data are decompressed by said decompressing means.

3. An apparatus for decompressing compressed data as set forth in claim 1, in which said frame memory further includes a third memory section for storing therein a picture decompressed by said decompressing means, and which further comprises picture selecting means for selecting a picture from among a plurality of pictures stored in said first memory section, said second memory section, and said third memory section, and in which said displaying means is operative to display said picture stored in any one of said first memory section, said second memory section, and said third memory section, selected by said picture selecting means, and two of said first memory section, said second memory section, and said third memory section, other than said one selected by said picture selecting means are operative to store therein pictures decompressed by said decompressing means.

4. A method of decompressing compressed data including a group of coded pictures having at least one Intra-coded picture, Predictive-coded pictures, and Bidirectionally-coded pictures, said compressed data being stored in recording means for recording said compressed data, comprising:

a reading step of reading said compressed data from said, recording means; a decompressing step of decompressing said compressed data read by said reading means from said recording means to store said decompressed data in a frame memory portion; a displaying step of displaying said decompressed data stored in said frame memory portion; a designating step of designating a coded picture; and a controlling step of controlling said reading step to have said reading step have a step of reading said coded picture designated in said designating step from said recording means and controlling said decompressing step to have said decompressing step have a step of decompressing said coded picture read by said reading means, and in which said frame memory portion includes a first memory section for storing therein a picture decompressed in said decompressing step, and a second memory section for storing therein a picture immediately subsequent to said picture stored in said first memory section and decompressed by said step, said reading means having a step of reading said Intra-coded picture, Predictive-coded pictures intervening between said Intra-coded picture and said coded picture designated by said picture designating means, and said coded picture designated by said picture designating means, and said decompressing step having a step of assuming two operating states including a Predictive-coded picture decompressing operating state, in which said decompressing step has a step of decompressing, in sequence, said Intra-coded picture and said Predictive-coded pictures intervening between said Intra-coded picture and said coded picture designated by said picture designating means under the condition that said coded picture designated by said picture designating means is a Predictive-coded picture, and a Bidirectionally-coded picture reading operation state in which said decompressing step having a step of decompressing, in sequence, said Intra-coded picture and said Predictive-coded pictures intervening between said Intra-coded picture and a Predictive-coded picture read in said reading step immediately prior to said coded picture designated in said designating step, and then decompressing said coded picture designated in said designating step on the basis of two of said Predictive-coded pictures immediately decompressed prior to said coded picture designated by said picture designating means under the condition that said coded picture designated in said designating step is a Bidirectionally-coded picture, and said controlling step having a step of controlling said displaying step of displaying said decompressed data stored in said frame memory portion asynchronously with the timing of said decompressing step.

5. A method of decompressing compressed data as set forth in claim 4, wherein and in which said frame memory includes a third memory section for storing therein data to be displayed in said displaying step while said compressed data are decompressed in said decompressing step.

6. A method of decompressing compressed data as set forth in claim 5, wherein said frame memory portion further includes a third memory section for storing therein a picture decompressed in said decompressing step, and which further comprises a picture selecting step of selecting a picture from among a plurality of pictures stored in said first memory section, said second memory section, and said third memory section, and in which said displaying step has a step of displaying said picture stored in any one of said first memory section, said second memory section, and said third memory section, selected in said picture selecting step, and two of said first memory section, said second memory section, and said frame memory section, other than said one selected by said picture selecting means are operative to store therein pictures decompressed in said decompressing step.

* * * * *

UNITED STATES PATENT AND TRADEMARK OFFICE
CERTIFICATE OF CORRECTION

PATENT NO. : 7,062,149 B2 Page 1 of 1
APPLICATION NO. : 09/819955
DATED : June 13, 2006
INVENTOR(S) : Horiyuki Seki et al.

It is certified that error appears in the above-identified patent and that said Letters Patent is hereby corrected as shown below:

Column 14, claim 2, line 3, please delete "said".

Signed and Sealed this

Seventh Day of November, 2006

JON W. DUDAS
*Director of the United States Patent and Trademark Office*